(12) United States Patent
Horie et al.

(10) Patent No.: US 10,725,817 B2
(45) Date of Patent: Jul. 28, 2020

(54) REDUCING SPIN COUNT IN WORK-STEALING FOR COPYING GARBAGE COLLECTION BASED ON AVERAGE OBJECT REFERENCES

(71) Applicant: INTERNATIONAL BUSINESS MACHINES CORPORATION, Armonk, NY (US)

(72) Inventors: Michihiro Horie, Saitama (JP); Hiroshi Horii, Tokyo (JP); Kazunori Ogata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 16/185,880

(22) Filed: Nov. 9, 2018

(65) Prior Publication Data

US 2020/0151003 A1     May 14, 2020

(51) Int. Cl.
   *G06F 9/48*     (2006.01)
   *G06F 12/02*    (2006.01)
(52) U.S. Cl.
   CPC ........ *G06F 9/4843* (2013.01); *G06F 12/0253* (2013.01); *G06F 2212/1044* (2013.01)
(58) Field of Classification Search
   CPC .................................................. G06F 9/4843
   See application file for complete search history.

(56) References Cited

U.S. PATENT DOCUMENTS

| 9,038,087 | B2 | 5/2015 | Ringseth et al. |
| 9,262,233 | B1 | 2/2016 | Reed et al. |
| 9,348,658 | B1* | 5/2016 | Robison ................. G06F 9/522 |
| 2014/0282574 | A1* | 9/2014 | Marathe ................ G06F 9/4881 718/103 |
| 2016/0170813 | A1* | 6/2016 | Robison ................. G06F 9/522 718/106 |
| 2016/0232035 | A1* | 8/2016 | Lev ........................ G06F 9/5083 |
| 2018/0181441 | A1 | 6/2018 | Harris |

OTHER PUBLICATIONS

Hassanein, Wessam, "Understanding and Improving JVM GC Work Stealing at the Data Center Scale", ISMM'16, Jun. 2016, pp. 46-54.

* cited by examiner

*Primary Examiner* — Sisley N Kim
(74) *Attorney, Agent, or Firm* — Tutunjian & Bitetto, P.C.; Vazken Alexanian

(57) ABSTRACT

A method is provided for controlling a number of Garbage Collection (GC) threads in a computer system implementing a copying GC process which copies live objects and involves states including a spin state, a yield state, and a sleep state. The method includes determining the number of GC threads to come back to for copying with work-stealing from a given one of the states based on a predicted number of object references, responsive to a number of currently stealable tasks being less than a threshold. The predicted number of object references is calculated using a past average number of object references. The method further includes determining the number of GC threads to come back to for copying work from the given one of the states based on the number of currently stealable tasks, responsive to the number of currently stealable tasks being equal to or greater than the threshold.

17 Claims, 3 Drawing Sheets

REDUCING SPIN COUNT IN WORK-STEALING FOR COPYING GARBAGE COLLECTION BASED ON AVERAGE OBJECT REFERENCES

BACKGROUND

Technical Field

The present invention generally relates to data processing, and more particularly to reducing spin count in work-stealing for copying garbage collection based on average object references.

Description of the Related Art

In copying Garbage Collection (GC) in Open Java® Development Kit (OpenJDK), work-stealing is used for load balance. Here, a task in work-stealing is an object.

After finishing all the tasks that an owner thread has in its deque (double-ended queue), it starts trying to steal other tasks from other threads' deques.

When a GC thread fails to steal a task multiple times continuously, it transits to another mode. The other mode involves repeating the following steps with another trial of the steal: (1) spin loop and then try to steal a task; (2) yield and then try to steal a task; and (3) sleep and then try to steal a task. When all GC threads' deques becomes empty, a GC finishes.

When there are few tasks that can be stolen, the chance of steal success will become small. The situation of having fewer tasks can happen if objects have few references on average.

However, a spin loop consumes CPU resources. Hence, there is a need for reducing spin count in work-stealing for copying garbage collection.

SUMMARY

According to an aspect of the present invention, a computer-implemented method is provided for controlling a number of Garbage Collection (GC) threads in a computer system implementing a copying GC process which copies live objects and involves states including a spin state, a yield state, and a sleep state. The method includes determining, by a processor device, the number of GC threads to come back to for copying with work-stealing from a given one of the states based on a predicted number of object references, responsive to a number of currently stealable tasks being less than a threshold. The predicted number of object references is calculated using a past average number of object references. The method further includes determining, by the processor device, the number of GC threads to come back to for copying work from the given one of the states based on the number of currently stealable tasks, responsive to the number of currently stealable tasks being equal to or greater than the threshold.

According to another aspect of the present invention, a computer program product is provided for controlling a number of Garbage Collection (GC) threads in a computer system implementing a copying GC process which copies live objects and involves states including a spin state, a yield state, and a sleep state. The computer program product includes a non-transitory computer readable storage medium having program instructions embodied therewith. The program instructions are executable by a computer to cause the computer to perform a method. The method includes determining, by the processor device of the computer, the number of GC threads to come back to for copying with work-stealing from a given one of the states based on a predicted number of object references, responsive to a number of currently stealable tasks being less than a threshold. The predicted number of object references is calculated using a past average number of object references. The method further includes determining, by the processor device, the number of GC threads to come back to for copying work from the given one of the states based on the number of currently stealable tasks, responsive to the number of currently stealable tasks being equal to or greater than the threshold.

According to yet another aspect of the present invention, a computer processing system is provided for controlling a number of Garbage Collection (GC) threads in a copying GC process which copies live objects and involves states including a spin state, a yield state, and a sleep state. The computer processing system includes a memory for storing program code. The computer processing system further includes a processor device for running the program code to determine the number of GC threads to come back to for copying with work-stealing from a given one of the states based on a predicted number of object references, responsive to a number of currently stealable tasks being less than a threshold. The predicted number of object references is calculated using a past average number of object references. The processor further runs the program code to determine the number of GC threads to come back to for copying work from the given one of the states based on the number of currently stealable tasks, responsive to the number of currently stealable tasks being equal to or greater than the threshold.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to spin-less work-stealing for parallel copying garbage collection (GC).

In an embodiment, the present invention is configured to avoid performing a spin loop when possible given the significant computational resources typically involved in performing a spin loop. In this way, a more efficient copying garbage collection can be performed.

In an embodiment involving a block (A) and a block (B), where block (A) involves copying with work-stealing and block (B) involves terminating with spin, yield, or sleep, the present invention controls the number of GC threads from transit from block (B) to block (A) by avoiding many unnecessary transits. In an embodiment, control is achieved by using average object references as one of the metrics to device how many GC threads should transit from block (B) to block (A). In this way, the very difficult task of estimating how many GC threads should transit from (B) to (A) is avoided. Moreover, the present invention advantageously reduces the spin count in block (B) by the guarantee that enough GC threads have already transited to block (A) and the remainder of the GC threads in block (B) do not need to check a task existence frequently.

Figure 1:
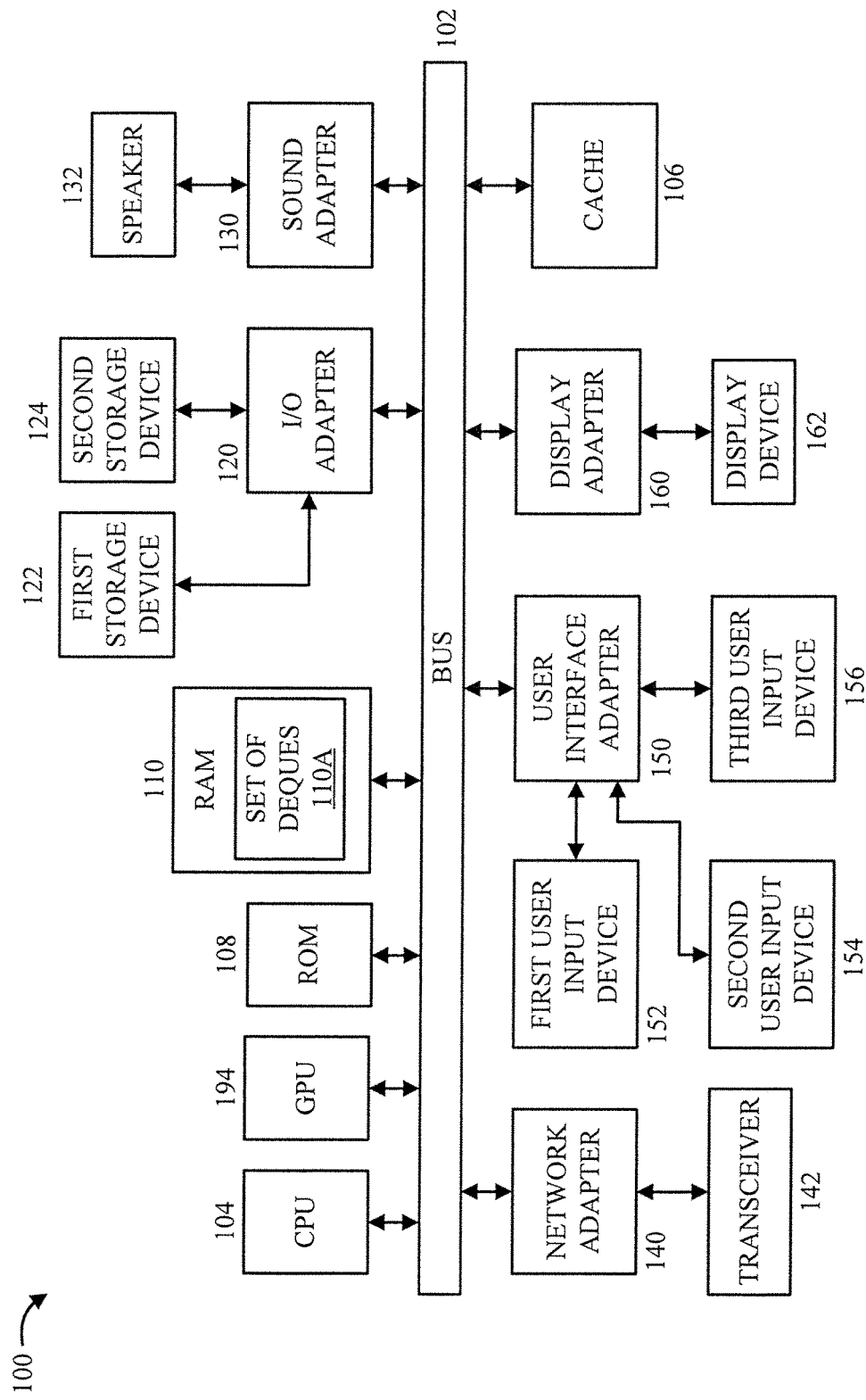
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is connected to at least the CPU 104 via system bus 102. Any of the CPU 104 and/or the GPU 194 can include one or more cores. In an embodiment, at least one the CPU 104 and/or the GPU 194 is configured to perform multi-threaded processing. In an embodiment, a portion of the RAM 110 can be used to implement a set of deques 110A. In an embodiment, the set of deques 110A is used to implement a heap. For example, in an embodiment, the set of deques 110A can include two deques, with each deque representing half of the heap. Of course, other numbers of deques and other arrangements can be used, given the teachings of the present invention provided herein, while maintaining the spirit of the present invention.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
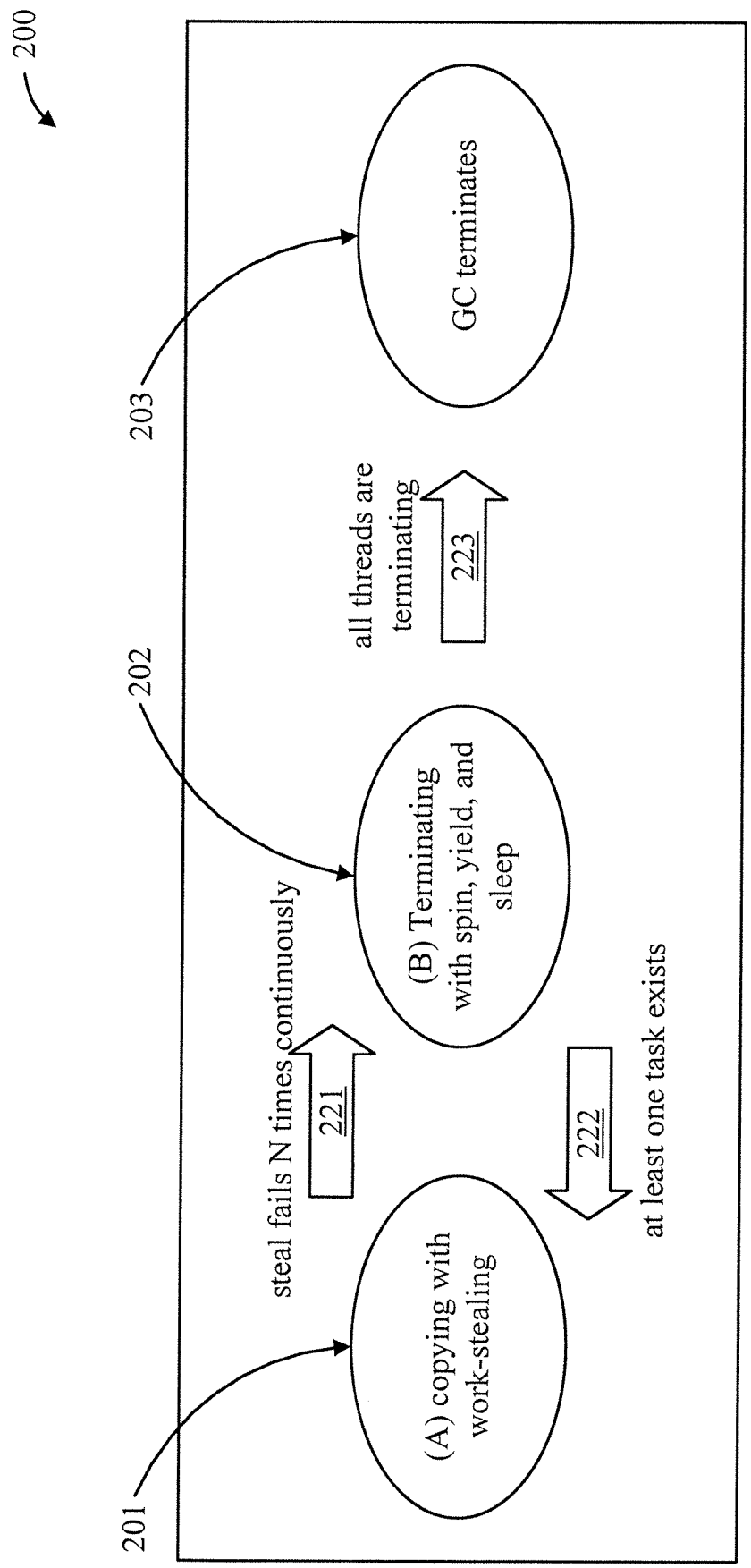
FIG. 2 is a high-level block diagram showing an exemplary scenario/process to which the present invention can be applied, in accordance with an embodiment of the present invention.

Further, it is to be appreciated that processing system 100 may perform at least part of the method described herein including, for example, at least part of method 200 of FIG. 2.

Figure 3:
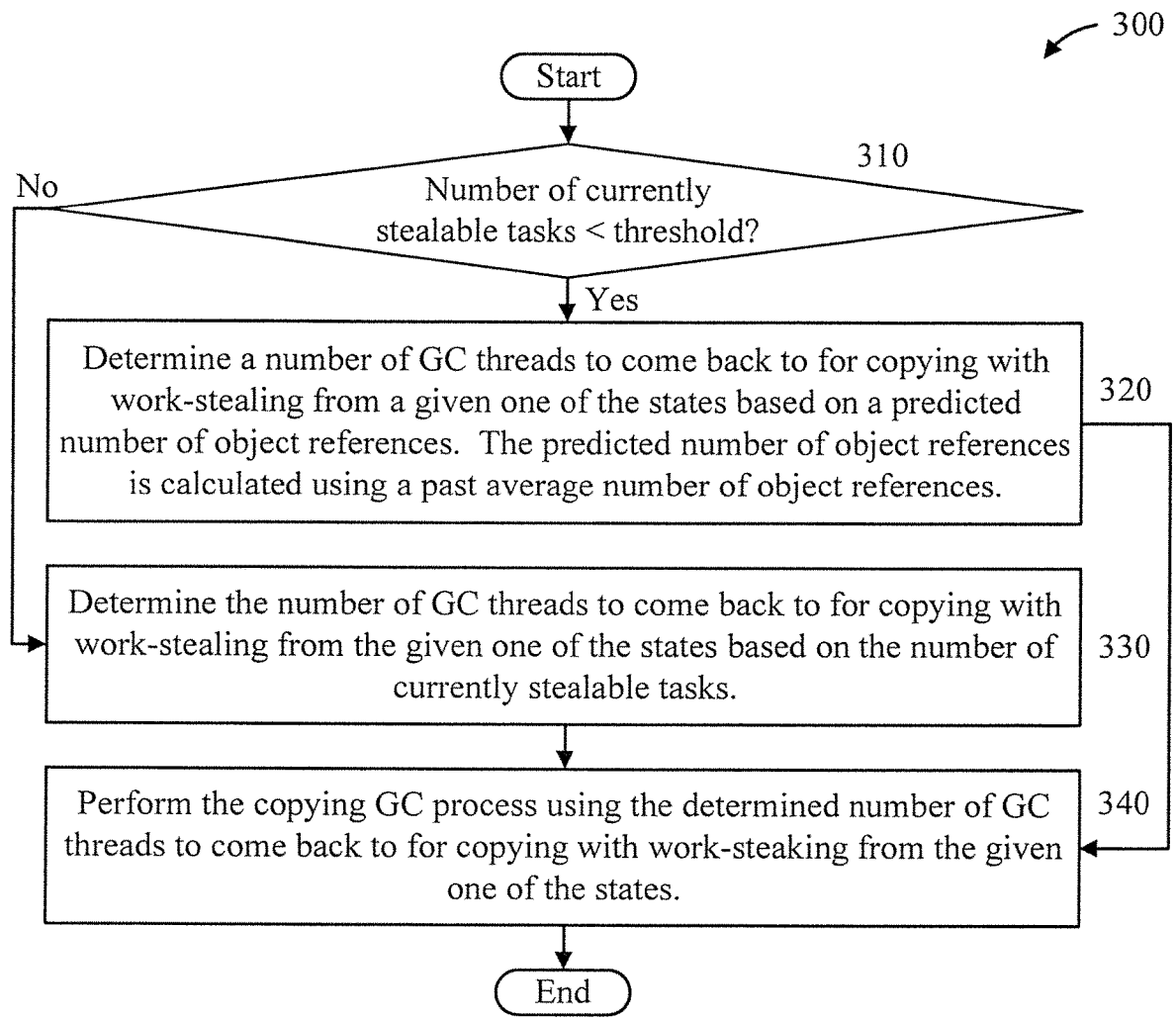
FIG. 3 is a flow diagram showing an exemplary method for controlling the number of Garbage Collection (GC) threads processing copying works in a computer system implementing a copying GC process which copies live objects, in accordance with an embodiment of the present invention.

FIGS. 2-3 are diagrams showing various exemplary methods in accordance with various embodiments of the present invention. The methods are directed to various aspects of copying Garbage Collection (GC). In an embodiment, the copying GC can involve the use of a set of deques (double ended queues) or other type of memory structure where a "source" or a "from" area and a "destination" or a "to" area can be implemented. The source area can represent a current working area, and the destination area can represent a dedicated garbage collection area. In an embodiment of the copying GC, objects are copied from a source space (e.g., a source deque space) to a destination pace (e.g., a destination deque space). At garbage collection time, the garbage collector creates an empty destination area in memory (of the same size as the source area), copies the live objects from the source area to the destination area (making sure that pointers are referring to the destination area), disposes the source area, and finally uses the destination area as the new source area. In an embodiment, the set of deques or other structure(s) can be used to implement a heap.

In the descriptions of these methods, the term "original object" refers to an object in the source space that is to be copied to the destination place in the copying GC. Moreover, the term "copied one(s)", usually followed by "of the original object(s)" refers to an object that resides in the destination place, having already being copied thereto from the source place.

FIG. 2 is a high-level block diagram showing an exemplary scenario/process 200 to which the present invention can be applied, in accordance with an embodiment of the present invention.

The scenario/process 200 involves a state transition in copying GC with work-stealing.

The following tasks are performed:
(block A—201) copying with work-stealing; and
(block B—202) terminating with spin, yield, or sleep.

Regarding the preceding tasks, a steal fails N times continuously 221, and at least one task exists 222.

Responsive to all threads terminating 223, the GC terminates 203.

In an embodiment, the present invention can be used to decrease the spin count in block B (i.e., "terminating with spin, yield, or sleep").

FIG. 3 is a flow diagram showing an exemplary method 300 for controlling the number of Garbage Collection (GC) threads in a computer system implementing a copying GC process which copies live objects, in accordance with an embodiment of the present invention. The method 300 involves states including a spin state, a yield state, and a sleep state.

At block 310, determine whether the number of currently stealable tasks is less than a threshold. If so, then proceed to block 320. Otherwise, proceed to block 330.

The threshold is user selectable, and can be based on, for example, but not limited to, the total number of GC threads.

At block 320, determine a number of GC threads to come back to for copying with work-stealing from a given one of the states based on a predicted number of object references. The predicted number of object references is calculated using a past average number of object references. The past average number of object references is determined by recording and calculating how many object references have been resolved when creating new tasks from a task during the work-stealing process.

At block 330, determine the number of GC threads to come back to for copying with work-stealing from the given one of the states based on the number of currently stealable tasks.

At block 340, perform the copying GC process using the determined number of GC threads to come back to for copying with work-steaking from the given one of the states. In this way, stale references can be collected and corresponding memory freed for other uses.

It is to be appreciated that the present invention does not misjudge how many GC threads come back to work, even if the number of currently stealable tasks is small, by using the metric of the average object references. This metric is the past record of how many child tasks were created, and us used to decide how many child tasks would be created next.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for controlling a number of Garbage Collection (GC) threads in a computer system implementing a copying GC process which copies live objects and involves states including a spin state, a yield state, and a sleep state, the method comprising: determining, by a processor device, the number of GC threads to come back to for copying with work-stealing from a given one of the states based on a predicted number of object references, responsive to a number of currently stealable tasks being less than a threshold, wherein the predicted number of object references is calculated using a past average number of object references, wherein the past average number of object references is used to determine a current number of child tasks to create; and determining, by the processor device, the number of GC threads to come back to for copying work from the given one of the states based on the number of currently stealable tasks, responsive to the number of currently stealable tasks being equal to or greater than the threshold.

2. The computer-implemented method of claim 1, wherein the past average number of object references indicates a number of past created child tasks.

3. The computer-implemented method of claim 1, further comprising performing the copying GC process using the determined number of GC threads to come back to for copying with work-steaking from the given one of the states.

4. The computer-implemented method of claim 1, wherein the determining steps are performed responsive to a state transition from one of the states to the given state.

5. The computer-implemented method of claim 1, wherein the spin state comprises performing a spin loop and trying to steal a task.

6. The computer-implemented method of claim 1, wherein the yield state comprises yielding to another one of the GC threads and trying to steal a task.

7. The computer-implemented method of claim 1, wherein the sleep state comprises sleeping for a time period and trying to steak a task.

8. A computer program product for controlling a number of Garbage Collection (GC) threads in a computer system implementing a copying GC process which copies live objects and involves states including a spin state, a yield state, and a sleep state, the computer program product comprising a non-transitory computer readable storage medium having program instructions embodied therewith, the program instructions executable by a computer to cause the computer to perform a method comprising:
    determining, by the processor device of the computer, the number of GC threads to come back to for copying with work-stealing from a given one of the states based on a predicted number of object references, responsive to a number of currently stealable tasks being less than a threshold, wherein the predicted number of object references is calculated using a past average number of object references, wherein the past average number of object references is used to determine a current number of child tasks to create; and determining, by the processor device, the number of GC threads to come back to for copying work from the given one of the states based on the number of currently stealable tasks, responsive to the number of currently stealable tasks being equal to or greater than the threshold.

9. The computer program product of claim 8, wherein the past average number of object references indicates a number of past created child tasks.

10. The computer program product of claim 8, wherein the method further comprises performing the copying GC process using the determined number of GC threads to come back to for copying with work-steaking from the given one of the states.

11. The computer program product of claim 8, wherein the determining steps are performed responsive to a state transition from one of the states to the given state.

12. The computer program product of claim 8, wherein the spin state comprises performing a spin loop and trying to steal a task.

13. The computer program product of claim 8, wherein the yield state comprises yielding to another one of the GC threads and trying to steal a task.

14. The computer program product of claim 8, wherein the sleep state comprises sleeping for a time period and trying to steak a task.

15. A computer processing system for controlling a number of Garbage Collection (GC) threads in a copying GC process which copies live objects and involves states including a spin state, a yield state, and a sleep state, the computer processing system comprising: a memory for storing program code; and a processor device for running the program code to determine the number of GC threads to come back to for copying with work-stealing from a given one of the states based on a predicted number of object references, responsive to a number of currently stealable tasks being less than a threshold, wherein the predicted number of object references is calculated using a past average number of object references, wherein the past average number of object references is used to determine a current number of child tasks to create; and determine the number of GC threads to come back to for copying work from the given one of the states based on the number of currently stealable tasks, responsive to the number of currently stealable tasks being equal to or greater than the threshold.

16. The computer processing system of claim 15, further comprising a set of deques for implementing a portion of the copying GC process.

17. The computer processing system of claim 15, wherein the past average number of object references indicates a number of past created child tasks.

* * * * *